United States Patent Office 3,518,062
Patented June 30, 1970

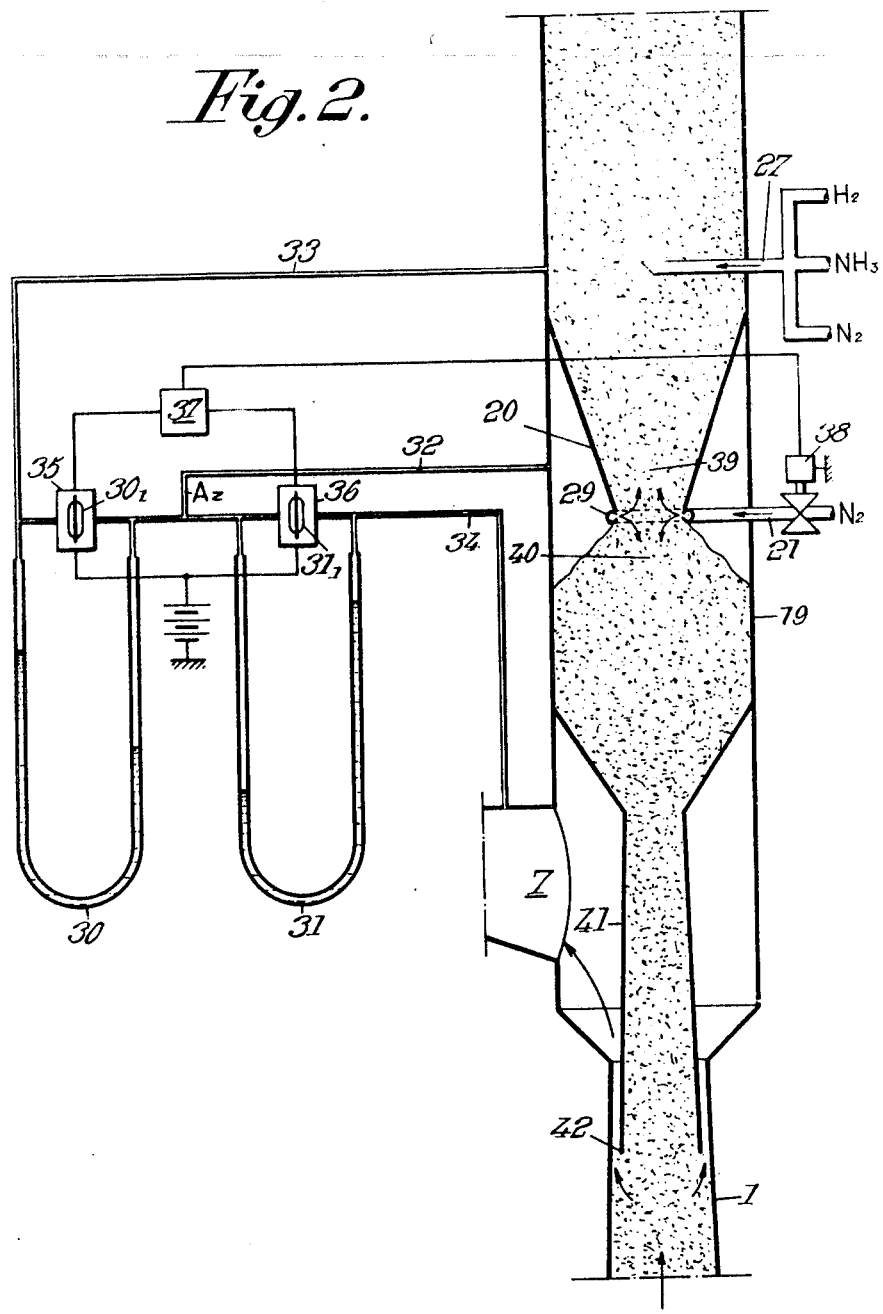

3,518,062
APPARATUS FOR THE PRODUCTION OF URANIUM FLUORIDE
Maurice Delange, Mennecy, Henri Huet, Saint-Vrain, and Paul Vertes, Antony, France, assignors to Commissariat a l'Energie Atomique, Paris, France, an organization of France
Continuation of application Ser. No. 443,449, Mar. 29, 1965, which is a division of application Ser. No. 771,029, Oct. 31, 1958, now Patent No. 3,198,598. This application Apr. 4, 1968, Ser. No. 718,954
Claims priority, application France, Nov. 5, 1957, 750,882
Int. Cl. C01g 43/06
U.S. Cl. 23—284                3 Claims

ABSTRACT OF THE DISCLOSURE

Apparatus to produce uranium fluoride in which the uranium oxides $UO_3$ and $U_3O_8$ are fed to a vertical reduction reactor. The reduction reactor communicates through a funnel with a vertical hydrofluorination reactor. The active gases in the reactors are prevented from mixing. In the full form of the preferred embodiment, improved performance is achieved by the connection of a horizontal hydrofluorination reactor subsequent to the vertical reactor.

---

This application is a continuation of our copending U.S. patent application Ser. No. 443,449, filed by us on Mar. 29, 1965, now abandoned, for "Apparatus for the Production of Uranium Fluoride," and is a division of our copending U.S. patent application Ser. No. 771,029, filed by us on Oct. 31, 1958, now U.S. Pat 3,198,598, for "Methods and Apparatus in Which a Mass of Solid Material is Subjected to Two Successive Treatments by Gases."

The present invention relates to apparatus for the production of uranium fluoride.

According to a first feature of the invention, such an apparatus comprises a vertical reduction reactor to the top of which $UO_3$ and $U_3O_8$ oxides are fed, whereas at least one reducing gas is fed to the bottom of said reactor, a vertical hydrofluorination reactor having its top located under the bottom end of said reduction reactor and directly connected therewith, with means for feeding hydrofluoric acid gas to the bottom of said second mentioned reactor, and means between said two reactors for preventing the gases from said second mentioned reactor from mixing with the reducing gas fed to the bottom of said first mentioned reactor.

According to another feature of the invention, the apparatus comprises a substantially vertical reactor to the top of which uranium bioxide is fed and to the bottom of which hydrofluoric acid gas is fed so as to flow upwardly through the mass of uranium oxide circulating by gravity therethrough, a horizontal tubular reactor being connected to the bottom end of said first reactor with means for circulating uranium fluoride from said first mentioned reactor through the horizontal reactor, and means for circulating hydrofluoric acid gas through said horizontal reactor in countercurrent relation to the flow of uranium fluoride.

Preferred embodiments of the present invention will be hereinafter described with reference to the accompanying drawings given merely by way of example and in which:

FIG. 2 is a view, on an enlarged scale, of a portion of this plant.

Figure 1:
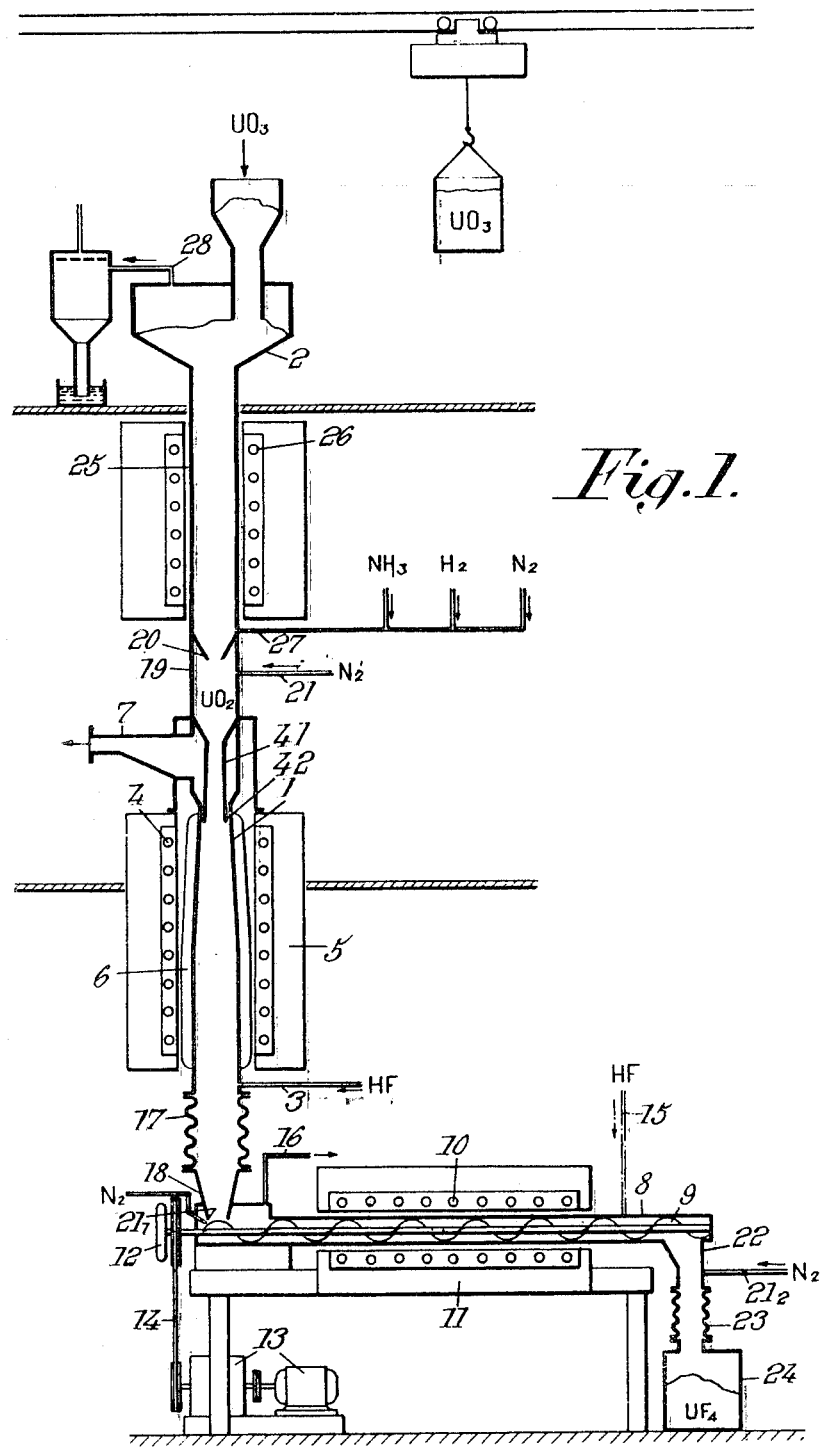
FIG. 1 shows, in diagrammatic vertical section, a plant for the treatment of uranium oxides for the obtainment of uranium fluoride.

The present invention relates to the production of uranium fluoride by the method according to which uranium oxide $UO_2$, previously agglomerated in the form of pellets or the like, is fed to the upper portion of the body 1 of a reactor called hydrofluorination reactor 4, 5 (FIG. 1) in the form of a substantially vertical column, a gaseous stream of hydrofluoric acid being fed at 3 and flowing out at 7. The reaction, which is an exothermic one, is maintained at a temperature ranging from 400 to 500° C. through cooling means such as the fins shown at 6.

The uranium oxide $UO_2$ which is subjected to this treatment must be prepared from $UO_3$ and $U_3O_8$ oxides, by reduction thereof under the action of a gas such as hydrogen, cracked ammonia gas or ammonia gas, either pure or mixed with these gases.

This reduction operation should be performed immediately before the $UO_2$ oxide that is obtained is fed to the hydrofluorination reactor, in continuous fashion, that is to say the solid material passing directly from the reduction reactor to the hydrofluorination reactor. But it is necessary to provide means for preventing the residual gases leaving the hydrofluorination reactor from passing into the reduction reactor where they would react with the gases present therein, in particular with ammonia. The action of the hydrofluoric acid gases on ammonia gas would produce ammonium fluoride $FNH_4$ which, when cooling down in the gas outflow pipes, would solidify and clog these pipes. One of the objects of the present invention is to provide apparatus for preventing such a mixing of the gases used in the two successive treatments of the solid materials.

The reduction operation is performed in a reactor to which pellets or grains of $UO_3$ and/or $U_3O_8$ are fed, these pellets being for instance of a diameter of about 12 mm. and of a thickness ranging from 4 to 5 mm. The pressure under which said pellets are agglomerated must be sufficient to ensure a good agglomeration and a suitable mechanical resistance. This pressure should be higher than 100 kg. per sq. cm. and it may be for instance of 500 kg. per sq. cm. or even more.

These pellets are treated in the reduction reactor, which is located immediately above the fluoriding reactor On the drawing, the reduction reactor is shown at 25, the pellets being fed thereto at 2. The heating means are shown at 26 and the reducing gases are supplied at 27, the residual gases flowing out at 28. The temperature of reduction may for instance range from 600 to 700° C., but this is merely an indication.

The fact that, due to the reduction of the $UO_3$ and $U_3O_8$ oxides, a certain amount of oxygen leaves the solid material, gives the bioxide that is formed a higher compactness and mechanical resistance.

The arrangement of the reduction reactor immediately above the hydrofluorination reactor is advantageous because it makes it possible to avoid any risk of reoxidation of the bioxide $UO_2$, as it is being conveyed from the reduction reactor to the hydrofluorination reactor.

The means for preventing each of the gases circulated through reactors 25 and 5, respectively, from passing to the other of said reactors are made as will now be described (with particular reference to FIG. 2).

A connection casing 19 extends between the two reactors 25 and 5. In this casing 19, there is provided a funnel 20, forming an extension of the outlet or bottom end of reactor 1. The cross-section of this funnel 20 may be adjustable from the outside, so as to permit adjusting the rate of flow of the solid material passing therethrough.

An inert gas, for instance nitrogen, is fed, in a direction transverse to the flow of uranium oxide, into the restricted section or bottom end of funnel 20, for instance through a distributing annular passage 29 provided with radial holes. This annular passage is fed with nitrogen under pressure through a conduit 21.

Manometric means are provided to give the pressure under which nitrogen is fed through passage 19 a value such that neither the reducing gases flowing at 27, nor the residual gases flowing out from body 1, can penetrate into casing 19.

Said manometric means include for instance a differential double manometer, for instance of the liquid type, the two elements of which are shown at 30, 31 (FIG. 2). They include a common branch connected at 32 to the central portion of casing 19 (and therefore measuring the nitrogen pressure $p$), and end branches connected at 33, 34, respectively, with the reduction reactor and the hydrofluorination reactor (therefore determining the respective pressures $p_1$ and $p_2$ in said reactors, in close proximity to casing 19).

For a good operation of the system, the pressure $p$ must be higher than both pressure $p_1$ and pressure $p_2$, which may be obtained either by a manual adjustment or by an automatic control.

In order to ensure an automatic control, the differential manometers are arranged as shown by FIG. 2 and constitute diaphragm manometers $30_1$, $31_1$ adapted to operate suitable contactors 35, 36 and, through a relay 37, an electro-valve 38 which controls the nitrogen pressure. As long as $p$ is higher than $p_1$ and $p_2$, contactors 35, 36 remain open. But, as soon as said pressure $p$ becomes lower than either $p_1$ or $p_2$, the corresponding contactor closes to actuate the electro-valve in the direction which causes an increase of the nitrogen pressure.

A system as above described permits of obtaining a continuous circulation, between reactors 25 and 5, of the mass of solid material constituted by the pellets, while preventing the respective gases which are circulated through said reactors from passing to the other one. The $UO_2$ pellets 39 (FIG. 2) flow down through funnel 20, under which they form a heap 40 in the lower part of casing 19. Then they pass into reactor 1. Nitrogen fed through annular passage 29 is divided into two streams which both flow through the masses of pellets, one of these streams being directed upwardly, that is to say toward the reduction reactor and the other being directed downwardly, that is to say toward the top end of the hydrofluorination reactor, from which it escapes toward 7 together with the residual gases from this last mentioned reactor.

At the outlet end of casing 19, the $UO_2$ pellets enter the hydrofluorination reactor, either directly or, as shown on the drawings, through a feed conduit 41 (advantageously including a convergent upper part and a divergent lower part) through which a stream of nitrogen also passes so as to escape, together with the residual gases from reactor 1, through an annular interval 42 in communication with the outflow or discharge chamber 7. The branch 34 of manometer 31 may be connected with said chamber 7, but it might be connected to any other space in communication with reactor 1.

Experience has shown that the purity obtained with a hydrofluorination reactor such as above described is not yet sufficient, in particular when magnesothermy is used for the final extraction of uranium from uranium fluoride. It is therefore necessary, in this case, to proceed to a supplementary treatment of the resulting product by means of fresh hydrofluoric acid.

Advantageously, the fluoride flowing out from the main hydrofluorination reactor is made to pass through a second hydrofluorination reactor horizontal but possibly slightly inclined, through which fresh hydrofluoric acid gas is caused to flow in counter-current relation to the solid material.

In the example shown by the drawings, evacuation of the uranium fluoride material is effected by means of a screw, but it might be constituted by vibrating or pulsing means.

On FIG. 1, the horizontal hydrofluorination reactor for performing this finishing treatment includes a horizontal tube 8, a screw 9 for causing uranium fluoride to travel through said tube, an electric heating system 10 and heat insulating means 11. Screw 9 is controlled either manually at 12, or by a speed reducing gear and motor system 13, 14. Fresh hydrofluoric acid is fed at 15 and the residual gases flow out at 16.

Screw 9 serves both to propel the solid material through tube 8 and to stir it in the presence of the gas.

The connection with the main reactor 1 is ensured by means of a corrugated sleeve 17 which is capable of absorbing thermal expansions.

Furthermore, means for preventing the gases which are used, respectively in reactor 8 and in reactor 1, from passing each into the other of said elements are provided as above described. The feed of nitrogen to said means is shown at $21_1$ at the bottom end of a funnel-shaped member 18.

When leaving tube 8, the solid material drops at 22 into a container 24, through a sleeve 23. In this case also, means such as above described may be used in order to prevent mixing of the gas present in tube 8 and of that present in chamber 24. The feed of nitrogen into said means is shown at $21_2$.

The various elements of the reactors and of the extracting mechanis mare made of materials which are capable of resisting the action of the reagents, for instance of nickel or of monel metal, the joints being made of material such as designated by the trademarks "Teflon" or "Hostaflon."

The provision of a horizontal reactor element 8 permits not only of obtaining a purer fluoride, but also of improving the capacity of production without substantially increasing the consumption of hydrofluoric acid. The rate of flow through reactor 1 can thus be increased, which is advantageous for the good operation thereof.

By way of indication, a horizontal tube 8, 3 meters long, heated over 1.5 meter and having a diameter of 15 cm., added to a reactor such as shown at 1, makes it possible to raise the rate of production of the whole to more than 50 kg. per hour, giving a very pure product, practically free from oxygen (owing to the provision of the reduction reactor). The presence of the nitrogen separating means also contributes in the obtainment of this very high purity, since it avoids parasitic reactions between different gases used in the processes.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

We claim:
1. An apparatus for the production of uranium fluoride which comprises, in combination, a first vertically elongated reduction reactor, means for feeding uranium oxides $UO_3$ and $U_3O_8$ to the top of said first reactor, means at the lower part of said first reactor for feeding thereto at least one reducing gas, heating means to promote reduction of said uranium oxides in said first reactor, outlet means at the top of said first reactor for the outflow of gases therefrom, a second vertically elongated hydrofluorination reactor having its top located under the bottom of said first reactor, funnel means to receive reduced uranium oxide from said first reactor and to drop the same into said second reactor, inlet means for said second reactor positioned below said funnel means, an outer shell connecting said first and said second reactors and enclosing said funnel means and defining therewith a gas space closed above by the upper part of the funnel means and closed below by the upper part of said inlet means for said second reactor, inlet means for feeding hydrofluoric acid gas to the bottom of said second reactor, outlet means for said hydrofluoric acid gas located below said upper part of said inlet means for said second reactor, and means between said two reactors for preventing mixing of gases from said second reactor with the reducing gas fed to said first reactor.

2. An apparatus as claimed in claim 1, comprising a horizontally elongated tubular reactor connected to the bottom end of said second vertically elongated reactor, means for circulating uranium fluoride from said second vertically elongated reactor through said horizontally elongated reactor, and means for circulating hydrofluoric acid gas through said horizontally elongated reactor in countercurrent relation to the flow of uranium fluoride therethrough.

3. An apparatus as claimed in claim 2 including a corrugated thermally expandable sleeve connecting said horizontal tubular reactor to the bottom end of said second vertical reactor.

References Cited
UNITED STATES PATENTS

| 2,232,657 | 2/1941 | Davis | 285—226 |
| 2,303,783 | 12/1942 | Adamoli | 23—277 |
| 2,351,214 | 6/1944 | Kaufmann et al. | 23—288 |
| 2,448,257 | 8/1948 | Evans | 23—262 |

FOREIGN PATENTS 786,800  11/1957  Great Britain.

JAMES H. TAYMAN, Jr., Primary Examiner

U.S. Cl. X.R.

23—262, 352, 277, 1; 165—83; 285—226